(12) United States Patent
Zafian et al.

(10) Patent No.: US 11,325,999 B2
(45) Date of Patent: May 10, 2022

(54) HIGH PRESSURE POLYETHYLENE TUBULAR REACTOR PROCESSES FOR IMPROVED WIRE COATING PRODUCT

(71) Applicant: ExxonMobil Chemical Patents Inc., Baytown, TX (US)

(72) Inventors: William J. Zafian, Houston, TX (US); Henri A. Lammens, Antwerp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/014,569

(22) Filed: Sep. 8, 2020

(65) Prior Publication Data

US 2021/0095060 A1 Apr. 1, 2021

Related U.S. Application Data

(60) Provisional application No. 62/908,319, filed on Sep. 30, 2019.

(51) Int. Cl.
| | | |
|---|---|---|
| *C08F 110/02* | (2006.01) | |
| *C08F 2/02* | (2006.01) | |
| *H01B 3/44* | (2006.01) | |

(52) U.S. Cl.
CPC ............ *C08F 110/02* (2013.01); *H01B 3/441* (2013.01)

(58) Field of Classification Search
None
See application file for complete search history.

(56) References Cited

U.S. PATENT DOCUMENTS

| | | |
|---|---|---|
| 5,430,091 A | 7/1995 | Mahabir |
| 5,795,941 A | 8/1998 | Cree et al. |
| 6,960,634 B2 | 11/2005 | Crowther et al. |
| 7,153,571 B2 | 12/2006 | Allermann |
| 8,183,328 B2 | 5/2012 | Vigano et al. |
| 8,211,985 B2 | 7/2012 | Vigano et al. |
| 9,284,415 B2 | 3/2016 | Allermann et al. |
| 10,494,457 B2 | 12/2019 | Berbee et al. |
| 10,696,757 B2 | 6/2020 | Berbee et al. |
| 10,759,928 B2 | 9/2020 | Brown et al. |
| 10,774,159 B2 | 9/2020 | Berbee et al. |

(Continued)

FOREIGN PATENT DOCUMENTS

| | | | |
|---|---|---|---|
| EP | 3260472 | 12/2017 | |
| EP | 3260473 A1 * | 12/2017 | ............ C08F 2/34 |

OTHER PUBLICATIONS

Kim, Y. et al. (1999) "Effect of Peroxide Modification on Melt Fracture of LLDPE During Extrusion," *Polymer Journal*, v.31, pp. 579-584.

(Continued)

*Primary Examiner* — Fred M Teskin
(74) *Attorney, Agent, or Firm* — ExxonMobil Chemical Patents Inc.-Law Department

(57) ABSTRACT

Methods for producing polyethylene compositions having broader melt index ratio and narrower molecular weight distribution in high pressure multi-feed tubular reactors are provided. The methods are useful in multi-feed tubular reactors comprising three or more reaction zones. The first reaction zone or the first and second reaction zone having a peak temperature that is lower than standard peak temperatures for polymerization of ethylene monomer in a tubular reactor.

15 Claims, 1 Drawing Sheet

(56) References Cited

U.S. PATENT DOCUMENTS

| 10,836,852 | B2 | 11/2020 | Karjala et al. |
| 2007/0149711 | A1 | 6/2007 | Chaudhary et al. |
| 2012/0285722 | A1 | 11/2012 | Nilsson et al. |
| 2014/0316096 | A1 | 10/2014 | Berbee et al. |
| 2018/0305476 | A1* | 10/2018 | Berbee .................... C08F 10/02 |

OTHER PUBLICATIONS

Sentmanat, M. et al. (2004) "Mechanism of Gross Melt Fracture Elimination in the Extrusion of Polyethylenes in the Presence of Boron Nitride," *Rheol. Acta*, v.43 pp. 624-633.

Sun, T. et al. (2001) "Effect of Short Chain Branching on the Coil Dimensions of Polyolefins in Dilute Solution", Macromolecules, v. 34(19), pp. 6812-6820.

Venet, C. et al. (1997) "Experimental Characterization of Sharkskin in Polyethylene," *J. Rheology*, v.41 pp. 873-892.

Vega, J. et al. (2011) "Eliminating Sharkskin Distortion in Polyethylene Extrusion by a Molecular Route", *J. Rheology*, v.55, pp. 855-873.

Sentmanat, M. et al. (2004) "Fingerprinting the Processing Behavior of Polyethylenes from Transient Extensional Flow and Peel Experiments in the Melt State," *Rheol Acta*, v.44, pp. 1-15.

* cited by examiner

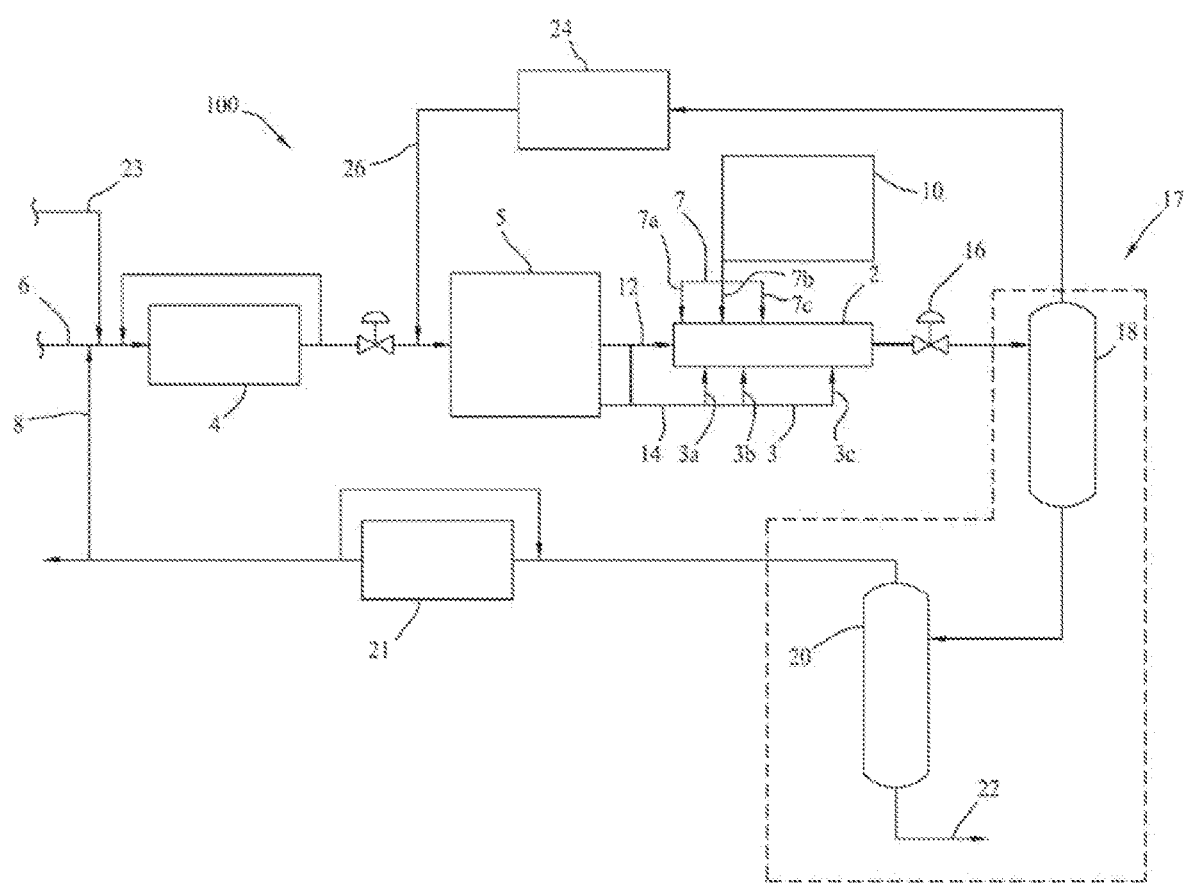

US 11,325,999 B2

HIGH PRESSURE POLYETHYLENE TUBULAR REACTOR PROCESSES FOR IMPROVED WIRE COATING PRODUCT

CROSS-REFERENCE TO RELATED APPLICATION

This application claims the benefit of U.S. Provisional Application 62/908,319 filed Sep. 30, 2019 entitled HIGH PRESSURE POLYETHYLENE TUBULAR REACTOR PROCESSES FOR IMPROVED WIRE COATING PRODUCT, the entirety of which is incorporated by reference herein.

FIELD OF THE INVENTION

The present invention relates to processes for producing polyethylene compositions having a broad melt index ratio and a narrow molecular weight distribution in high pressure multi-feed tubular reactors.

BACKGROUND OF THE INVENTION

Two fundamental properties of a polymer are its chemical structure and molecular weight distribution. These two characteristics can determine cohesive forces, mechanical properties (moduli and strength), transition temperatures (melting and softening point), and solubility and miscibility.

The melt index ratio for low density polyethylene compositions can be an indicator of molecular weight distribution and shear-thinning characteristic of the polymer. The higher the melt index ratio, the broader the expected molecular weight distribution with accompanying increases in shear-thinning behavior. Unfortunately, a broad molecular weight distribution means a wide distribution of polymer chain length, and lower tensile and impact strength. On the other hand, a narrow molecular weight distribution will yield better mechanical and processing properties such as reduction in brittleness.

A need exists, therefore, for processes that can produce polyethylene compositions having a broad melt index ratio and narrow molecular weight distribution.

SUMMARY OF THE INVENTION

Provided herein are polymerization processes comprising the step of polymerizing an ethylene monomer in a tubular reactor to produce a polyethylene composition having a broad melt index ratio and a narrow molecular weight distribution. As described herein, the tubular reactor is a multizone tubular reactor having at least three reaction zones. In an aspect, at least three reaction zones comprise a first reaction zone, a second reaction zone, and a third reaction zone. Each reaction zone spaced lengthwise along the tubular reactor. The first reaction zone has a peak temperature between about 10° C. to 50° C., lower than a peak temperature in the second reaction zone. In an aspect, the peak temperature in the first reaction zone is between about 240° C. to about 260° C. In an aspect, the peak temperature in the second reaction zone and the third reaction zone is between about 270° C. to 295° C.

Further provided are polymerization processes comprising the step of polymerizing an ethylene monomer in a tubular reactor to produce a polyethylene composition having a broad melt index ratio and a narrow molecular weight distribution. The tubular reactor is a multizone tubular reactor having at least five reaction zones. The at least five reaction zones comprises a first reaction zone, a second reaction zone, a third reaction zone, a fourth reaction zone and a fifth reaction zone. Each reaction zone spaced lengthwise along the tubular reactor. The first reaction zone and the second reaction zone each has a peak temperature between about 10° C. to 50° C. lower than a peak temperature in the third reaction zone. The peak temperature in the first reaction zone and the second reaction zone is between about 240° C. to about 260° C. The peak temperature in the third reaction zone, the fourth reaction zone and the fifth reaction zone are between about 270° C. to 310° C.

In an aspect, in the present polymerization processes, a co-monomer is polymerized together with the monomer. In an aspect, the pressure of the tubular reactor is between about 2,700 bar to about 3,050 bar. The inlet temperature of the first reaction zone is regulated by a temperature regulating heating zone. The peak temperature in each reaction zone is regulated by the amount of initiator added. In an aspect, the inlet temperature in each of the reaction zones after the first zone is regulated by at least one temperature regulating jacket cooler. In an aspect, monomer is discharged into the reactor at a plurality of monomer feed locations spaced lengthwise along the tubular reactor. In an aspect, initiator is discharged into the reactor at multiple free-radical initiator positions spaced lengthwise along the tubular reactor. The process further comprises polymerization of a co-monomer. In an aspect, the polymerization process comprises the step of separating and recycling unreacted monomer. In an aspect, the polymerization process comprises the step of adding initiator to the tubular reactor. In an aspect, the reaction zone is downstream of initiator injection position.

In an aspect, the polyethylene composition produced has a melt index ratio ($I_{21}/I_2$) between about 52 to about 55 and a molecular weight distribution between of about 5.7. In an aspect, the polyethylene composition has a density between about 0.920 g/cm$^3$ to about 0.927 g/cm$^3$. In an aspect, the polyethylene composition has a melt index between about 2.0 to about 4.0.

Presented herein are polyethylene compositions prepared by polymerizing a monomer mixture in a tubular reactor, wherein the tubular reactor is a multizone reactor having at least three reaction zones, comprising a first reaction zone, a second reaction zone, and a third reaction zone spaced lengthwise along the tubular reactor; wherein one or more of the first reaction zone and the second reaction zone has a peak temperature that is 10° C. to 30° C. lower than a peak temperature in the third reaction zone, wherein the polyethylene composition has a density between about 0.920 g/cm$^3$ and about 0.927 g/cm$^3$, an MI ($I_2$, 190° C., 2.16 kg) between about 2.0 g/10 min and about 4.0 g/10 min, an MIR ($I_{21}/I_2$) between about 51 and about 55, and a molecular weight distribution ($M_w/M_n$) less than or equal to about 6 or between about 5 to about 6.5. Further provided is a wire coating and/or wire coating product comprising one or more of the polyethylene compositions produced by the present polymerization processes.

BRIEF DESCRIPTION OF THE DRAWING

FIG. 1 is a schematic of a polymerization plant utilizing a tubular reactor having at least three reaction zones in accordance with the present disclosure.

DETAILED DESCRIPTION OF THE INVENTION

Before the present compounds, components, compositions, and/or methods are disclosed and described, it is to be understood that unless otherwise indicated this disclosure is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular embodiments only and is not intended to be limiting.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

For the purposes of this disclosure, the following definitions will apply:

As used herein, the terms "a" and "the" as used herein are understood to encompass the plural as well as the singular.

As used herein, the term "copolymer" means polymers having more than one type of monomer, including interpolymers, terpolymers, or higher order polymers.

All numerical values within the detailed description and the claims herein are modified by "about" or "approximately" the indicated value, taking into account experimental error and variations.

The term "density" as used herein, and unless otherwise specified, refers to the density of the polymer independent of any additives, such as antiblocks, which may change the tested value.

As used herein, when a polymer or copolymer is referred to as including an olefin, the olefin present in such polymer or copolymer is the polymerized form of the olefin. For example, when a copolymer is said to have an "ethylene" content of 35 wt. % to 55 wt. %, it is understood that the mer unit in the copolymer is derived from ethylene in the polymerization reaction and said derived units are present at 35 wt. % to 55 wt. %, based upon the weight of the copolymer. A copolymer can be higher order copolymers such as terpolymers, quaterpolymers, and the like.

The term "melt index" or "MI" is the number of grams extruded in 10 minutes under the action of a standard load and is an inverse measure of viscosity. A high MI implies low viscosity and low MI implies high viscosity. In addition, polymers are shear thinning, which means that their resistance to flow decreases as the shear rate increases. This is due to molecular alignments in the direction of flow and disentanglements.

As provided herein, MI ($I_2$, 190° C., 2.16 kg) is determined according to ASTM D-1238-E, also sometimes referred to as $I_2$ or $I_{2.16}$.

As provided herein, MI ($I_{21}$, 190° C., 21.6 kg) is determined according to ASTM D-1238-E, also sometimes referred to as $I_{21}$ or $I_{21.6}$.

The term "melt index ratio" or "MIR" (equivalently "melt flow ratio" or "MFR") is the ratio of $I_{21}/I_2$ and provides an indication of the amount of shear thinning behavior of the polymer and a parameter that might be correlated to the overall polymer mixture molecular weight distribution ("MWD") data obtained separately by using Gas Permeation Chromatography ("GPC") and possibly in combination with another polymer analysis including TREF.

Density is measured in accordance with ASTM D-1505.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of g·mol$^{-1}$.

As used herein, unless specified otherwise, percent by mole is expressed as "mol. %," and percent by weight is expressed as "wt. %."

MWD is equivalent to the expression $M_w/M_n$ and is also referred to as polydispersity index (PDI). The expression $M_w/M_n$ is the ratio of the $M_w$ to the $M_n$. The $M_w$ is given by $$M_w = \frac{\sum_i n_i M_i^2}{\sum_i n_i M_i},$$

the $M_n$ is given by $$M_n = \frac{\sum_i n_i M_i}{\sum_i n_i}$$

the $M_z$ is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Sun, T. et al. (2001) *Macromolecules*, v. 34(19), pg. 6812. The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: Sun, T. et al. (2001) *Macromolecules*, v. 34(19), pp. 6812-6820. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

Unless otherwise indicated, the distribution and the moments of molecular weight ($M_w$, $M_n$, $M_w/M_n$, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c) at each point in the chromatogram is calculated from the baseline-subtracted IR5 broadband signal intensity (I) using the following equation: c=βI, where β is the mass constant. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{a+1} + \frac{a_{PS}+1}{a+1} \log M_{PS}$$

where the variables with subscript "PS" stand for polystyrene while those without a subscript are for the test samples. In this method, $\alpha PS$=0.67 and $K PS$=0.000175 while α and K are for other materials as calculated and published in literature (Sun, T. et al. (2001) *Macromolecules*, v. 34, pg. 6812), except that for purposes of the present disclosure, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk wt. % of butene comonomer, α is 0.695, and K is 0.000579* (1−0.0075*w2b) for ethylene-hexene copolymer where w2b is a bulk wt. % of hexene comonomer, and α is 0.695 and K is 0.000579*(1−0.0077*w2b) for ethylene-octene copolymer where w2b is a bulk wt. % of octene comonomer. Concentrations are expressed in g/cm$^3$, molecular weight is expressed in g/mole, and intrinsic viscosity (hence K in the Mark-Houwink equation) is expressed in dL/g unless otherwise noted.

As used herein, the term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" is intended to embrace all structural isomeric forms of olefins, unless it is specified to mean a single isomer or the context clearly indicates otherwise.

As used herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used herein, the terms "polymerization temperature" and "reactor temperature" are interchangeable.

As used herein, "shear thinning ratio" refers to the complex viscosity at 190° C. at 0.01 rad/s over the complex viscosity at about 190° C. at about 100 rad/s (or the nearest measured point).

Polymerization processes in accordance with the present disclosure include methods for producing low density polyethylene compositions having a broader melt index ratio (also referred to herein sometimes as "melt flow ratio") and a narrower molecular weight distribution. In an aspect, the present processes include a multizone tubular reactor having three reaction zones or five reaction zones, where a first reaction zone of the three reaction zone tubular reactor and a first and second reaction zones of the five reaction zone tubular reactor operates at a lower peak temperature than standard peak temperature. Processes in accordance with the present disclosure produce low density polyethylene compositions with high melt index ratios and accompanying shear thinning behavior, while unexpectedly narrowing the MWD with lower process temperature in the first reaction zone of the three reaction zone tubular reactor and/or first and second reaction zones of the five reaction zone tubular reactor.

For present processes described, a tubular reactor is used to make polymer compositions by free radical initiation. A highly exothermic polymerization reaction is performed in the tubular reactor under high reactor operating pressure (e.g., 2000 bar to 3500 bar) under turbulent flow, at high temperatures (e.g., about 120° C. to about 330° C.). Heat is removed through a tube wall (not shown), which is liquid cooled. Tubular reactors can have outputs, which vary from 50 kT to 400 kT per annum.

FIG. 1 is a schematic of a polymerization plant 100 comprising a tubular reactor 2. As shown, the tubular reactor 2 comprises a tube (not shown) having a length from about 200 to about 1,600 meters, depending on desired heat removal capacity and a diameter of from about 20 to about 100 mm depending on the desired capacity and amount of turbulent flow necessary.

A primary compressor 4 is fluidically connected to the tubular reactor 2 and fluidically connected to an ethylene feed source via an intake conduit 6. Intake pressure of the primary compressor 4 is between about 20 bar to about 70 bar. The primary compressor 4 increases the pressure of ethylene monomer to between about 250 bar to about 350 bar. The primary compressor 4 can be a single compressor, that alone pressurizes the ethylene to the pressure of the recycle stream, or it may be two or more compressors in series or in parallel that, in combination, pressurize the fresh ethylene to the pressure of the ethylene recycle system. In addition to fresh ethylene, the primary compressor 4 can receive ethylene recycled from various units including a product separation unit and/or from primary and secondary compressor leakage systems, where available. In an aspect, the primary compressor 4 can be fluidically connected to a purge gas compressor 21 via a recycle conduit 8 for recycled ethylene from the purge gas compressor 21. Here, the primary compressor 4 pressurizes ethylene monomer to the pressure of the ethylene recycle system 24.

A secondary compressor 5 is fluidically connected to the primary compressor 4. The secondary compressor 5 increases the pressure of ethylene to an operating pressure of the tubular reactor 2, or between about 2,000 to about 3,500 bar. The secondary compressor 5 can include a number of compressor stages. The primary compressor 4 operates at a gas throughput in the range of from 30 tonnes/hour to 120 tonnes/hour ("T/h"), in the range of from 50 to 100 tonnes/hour and in the range of from 40 to 90 tonnes/hour. Ethylene is cooled upon discharge from the primary compressor 4 and prior to intake into the secondary compressor 5. Notwithstanding, the relative capacities of the compressors are immaterial to the present polymerization processes.

In an aspect, ethylene discharged from the primary compressor 4 can be divided into two streams, one stream being combined with recycled ethylene and discharged into the suction of the secondary compressor 5, and the other stream (not shown) can be injected into the ethylene/polymer mixture downstream of the high-pressure, let-down valve, thereby providing rapid cooling of the ethylene/polymer mixture prior to entry into the product separation unit. In an aspect, the primary compressor 4 has a discharge pressure that is equal the pressure of the high pressure ethylene recycle system and may be, for example, in the range between about 270 bar to about 350 bar, and in the range between about 280 bar to about 320 bar. Make-up ethylene can be supplied to the tubular reactor 2 at pressures between about 15 to about 90 bar.

The secondary compressor 5 compresses the ethylene to a pressure of at least 2,300 bar for supply to the tubular reactor 2. In an aspect, the pressure is between about 2,800 to about 3,100 bar and between about 2,900 to about 3,100 bar. Operation at pressures higher than 3,100 bar can be feasible, and might enhance conversion, but operation at such high pressures can increase costs. Similar to the primary compressor 4, the secondary compressor 5 can be driven by a single motor, or alternatively comprise two or more compressors in series or in parallel driven by separate motors. Any configuration of compressors is intended to be within the scope of this disclosure as long as said configuration is adapted to compress the ethylene from the intermediate pressure (of the ethylene as it leaves the primary compressor) to the desired reactor pressure, for example, between about 2,300 to about 3,100 bar.

Ethylene monomer is discharged into the tubular reactor 2 and heated to at least about 95° C., at least about 135° C., or at least about 160° C. in order to promote the decomposition of the initiator and start the polymerization reaction. Multiple free-radical initiator is injected at least three different positions 7 along the length of the tubular reactor, thereby defining at least three reaction zones.

In an aspect, as shown in FIG. 1, pressurized ethylene monomer is discharged from the secondary compressor 5 into the tubular reactor 2 to a plurality of monomer feed locations 3a, 3b, 3c spaced lengthwise along the tubular reactor 2. The plurality of monomer feed locations includes at least three (3) feed locations, illustrated as 3a, 3b, 3c in FIG. 1. However, depending on the process, the tubular reactor 2 can have more feed locations, e.g., up to ten (10) feed locations. In an aspect and as shown in FIG. 1, ethylene monomer can be fed into the plurality of monomer feed locations 3 on tubular reactor 2 from multiple conduits 12, 14 connected to the secondary compressor 5.

As also shown in FIG. 1, multiple free-radical initiator positions (as shown in FIG. 1, 3 free-radical initiator positions 7a, 7b, 7c) are also spaced lengthwise of the tubular reactor 2 to cause polymerization of monomer into polymer in at least three (3) reaction zones. In an aspect, monomer can be converted into polymer in five (5) reaction zones. Tubular reactors 2 comprising three reaction zones include a first reaction zone, a second reaction zone and a third reaction zone. Tubular reactors 2 comprising five reaction zones include a first reaction zone, a second reaction zone, a third reaction zone, a fourth reaction zone and a fifth reaction zone. In the case of five reaction zones, according to some embodiments, five (5) monomer feed locations can be spaced lengthwise along tubular reactor 2 (e.g., 2 feed locations in addition to the 3 locations 3a, 3b, and 3c shown in FIG. 1); and similarly, five (5) free-radical initiator positions (e.g., 2 free-radical initiator positions in addition to the 3 positions 7a, 7b, 7c shown in FIG. 1) are also spaced lengthwise of the reactor 2. Initiators can be oxygen, peroxides and similar agents.

Each initiator or catalyst injection position 7 is associated with each reaction zone. Injection of initiator causes an exothermic temperature rise that is removed by a cooling at the reaction zone and downstream of that reaction zone. The cooling takes place through the tube wall, optionally aided by a cooling liquid as a heat transfer medium and/or by a feed of cold monomer that is added downstream. Further, initiator can be added downstream to form another reaction zone for converting additional monomer into polymer.

Thus, as the reaction mixture travels along the length of the tube/tubular reactor, the temperature of the reaction mixture increases to a peak and then decreases until the next initiator injection position is reached, whereupon the process begins again. A reaction zone downstream of initiator injection position in which the polymerization reaction occurs is known as "the reaction zone." The tubular reactor 2 is generally equipped with at least one temperature regulated heating/cooling jacket in each reaction zone.

Polymerization commences immediately downstream of the first reaction zone thereby causing the temperature of the reaction mixture to rise due to the exothermic nature of the polymerization. As the temperature rises, initiator decomposition and polymerization increase in rate, accelerating the heat generation and causing the temperature to rise further.

As initiator is consumed, initiation and polymerization slow and, at the point where heat generation equals heat conducted away from the reaction mixture, the temperature peaks and then begins to fall.

In the present processes, polymerization commences in at least three reaction zones in the tubular reactor 2, each reaction zone commencing at each initiator injection position 7. In each reaction zone, ethylene is converted to polymer and, therefore, having a larger number of reaction zones will generally increase conversion. However, each reaction zone will typically necessitate increasing the length of the tubular reactor and, therefore, will increase the pressure drop across the reactor. In the present processes, initiator may be fed from an initiator source 10 and injected at 4, 5, or 6 different positions along the tubular reactor 2 thereby giving rise to 4, 5, or 6 reaction zones. For example, the tubular reactor may comprise five or six reaction zones and further comprise five or six initiator positions (e.g., initiator positions 7a, 7b, 7c as shown in FIG. 1, plus two or three additional initiator positions).

Multizone tubular reactors in accordance with the present processes has a first reaction zone, or a first reaction zone and a second reaction zone, each operating at lower temperatures than standard processing temperatures. The lower temperature of the first reaction zone and the second reaction zone provides a polyethylene composition having a narrower molecular weight and broader higher melt index ratio (also referred to as "melt index ratio"). For example, a first reaction zone of three reaction zones in the tubular reactor has a temperature that is between about 10° C. to about 50° C. lower than a peak temperature in the second reaction zone and the third reaction zone. For a tubular reactor having five reaction zones, a first reaction zone and a second reaction zone have a lower than standard temperature while the third reaction zone, the fourth reaction zone and the fifth reaction zone remain as standard.

As shown in FIG. 1, multiple free-radical initiator or catalyst injection positions 7 are spaced lengthwise of the tube of tubular reactor 2 to cause the monomer to be converted into polymer in the at least three reaction zones formed inside the tubular reactor 2. In an aspect, for large tubular reactors, ethylene can be discharged from the secondary compressor 5 via two or more discharge streams through conduits 12, 14, with one stream entering a front end of the tubular reactor 2 and the other stream(s) entering as sidestream(s) (not shown). Sidestreams can discharge into the tubular reactor 2 upstream of the initiator injection position 7. Before discharging into the tubular reactor 2, sidestreams are cooled, for example, to between 10° C. and 20° C. in order to reduce the temperature of the reaction mixture. As described herein, the total conversion of monomer to polymer along the length of the reactor is, in practice, limited by the ability to cool the reaction mixture, and so cooling sidestreams can allow an increase in conversion for a given tubular reactor.

Polyethylene composition produced by polymerization processing in the tubular reactor 2 can be discharged directly into a separation unit 17 or to a product cooler (not shown). For example, as shown in FIG. 1, mixture of polymer and unreacted monomer formed in the tubular reactor 2 discharges to a separation unit 17. As shown in FIG. 1, in an aspect, the separation unit 17 comprises a high pressure separator 18 and a low pressure separator 20. Product separation, however, can be carried out in a single stage if desired. As shown in FIG. 1, for multiple stage separations, in a first stage, polymer is separated from unreacted ethylene. Unreacted ethylene gas can be fed to a high pressure recycle gas system 24. In a second stage, molten polymer is decompressed and separated ethylene gas can flow to a purge gas compression system 21. The pressure in the last stage of the separator unit 17 (or in the low pressure separator 20) is in the range of from about 1 to about 10 bar, or from about 1 to about 3 bar.

In an aspect, as shown in FIG. 1, the high pressure separator 18 receives monomer/polymer mixture discharged from the tubular reactor 2. The high pressure separator 18 operates in the range of from about 200 to about 350 bar. The high pressure separator 18 is connected to a low pressure separator 20 for further monomer removal. Molten polymer is discharged from the low pressure separator 20 via molten polymer conduit 22 to a polymer finishing section (not shown) with an extruder (not shown). The high pressure separator 18 discharges separated volatile monomer-rich phase of unreacted monomer into the recycle gas system 24 at a pressure similar to pressurized gas discharged from the primary compressor 4. Unreacted ethylene monomer discharges from the recycle gas system 24 through recycle conduit 26 and is combined with ethylene feed from the primary compressor 4 and discharged into the secondary compressor 5. In an aspect, unreacted monomer from the low pressure separator 20 discharges into a pressure purge compressor 21 at a pressure above an intake pressure of the primary compressor 4. As described herein, in a further aspect, a chain transfer agent can be added at various positions in the process.

The present processes require that the pressure drop over the length of the tube reactor be maintained at a level such as to maintain a flow velocity of the reaction mixture in the tubular reactor of at least 6 m/s. It has been found that the flow velocity influences the efficiency of cooling of the reaction mixture by heat transfer through the reactor tube walls, and that the heat transfer is particularly poor at low flow velocities. For certain types of tubular reactors where sidestream injection is not utilized, the actual minimum flow velocity which is desirable depends on the temperature of the cooling jacket. Where the cooling jacket contains fluid at a temperature below 50° C., and particularly can be as low as 20° C., such as water which is maintained at low temperature by cooling means such as a cooling tower, then the flow velocity will preferably be at least 14 m/s in order to inhibit formation of a solid polymer layer on the inside of the tubular reactor which itself further inhibits heat transfer (even then, it may be necessary to allow the temperature of the cooling jacket in a particular reaction zone to rise periodically, in order to disperse any polymer layer which has formed). Accordingly, the flow velocity may be in excess of 14 m/s and is advantageously significantly higher, for example, in the range of from 14 to 20 m/s.

Generally, peak temperature for a reaction zone can be in the range of from about 200° C. to about 350° C. As discovered, to produce a polyethylene composition having a narrow molecular weight distribution with broaden melt index ratio, the peak temperature for a first reaction zone and a second reaction zone of the tubular reactor with five reaction zones is between about 240° C. to about 260° C., or between about 240° C. to about 250° C. In subsequent reaction zones, the peak temperature is between about 270° C. to about 295° C., between about 290° C. to about 315° C. and between about 280° C. to about 340° C.

Table 1 below provides a comparison between the standard (typical) peak temperatures of each reactor zone in a five reaction zone tubular reactor to the peak temperatures per zone provided by the present methods (also referred to herein as processes).

TABLE 1

| Reaction Zone | Peak Temperature ° C. Standard/Typical | Peak Temperature ° C. Present Methods |
|---|---|---|
| First Reaction Zone | 280 to 320 | 240 to 260 |
| Second Reaction Zone | 270 to 315 | 250 to 260 |
| Third Reaction Zone | 270 to 295 | 270 to 295 |
| Fourth Reaction Zone | 260 to 295 | 270 to 295 |
| Fifth Reaction Zone | 250 to 295 | 270 to 295 |

Generally, increases in temperature in a reaction zone are proportional to the amount of polymer made in that reaction zone and so operating at high peak temperatures favors high conversion. However, the kinetics of ethylene polymerization are such that as the temperature rises, chain transfer to polymer increases relative to propagation of linear chains and the polydispersity index increases, resulting in an increase in the haze value of the polymer produced. Accordingly, when it is desired to manufacture a low haze grade of polymer, it will be necessary to operate at lower peak temperatures.

Further, in each reaction zone upstream of an initiator injection point (i.e., in all but the last reaction zone) the reaction mixture is cooled to at least 20° C., to at least 40° C., and to at least 50° C., below the peak temperature of that reaction zone before the reaction mixture reaches the next initiator injection point. For certain tubular reactors, cooling in any reaction zone can be performed a cooling jacket or a combination of a cooling jacket. Alternatively, the tubular reactors utilizes sidestream injections of cooled ethylene.

In the process of polymerizing ethylene in a tubular reactor, once the desired throughput of ethylene through the secondary compressor and into the reactor is established, the pressure in the reactor is controlled by a high-pressure, let-down valve 16, through which the product mixture (polyethylene composition and unreacted monomer) discharges from the tubular reactor 2. Opening the valve 16 decreases pressure in the tubular reactor; closing the valve increases the pressure. Moreover, a pressure drop exists along the length of the tubular reactor which forces the reaction mixture along the reactor at a desired velocity (the term "reactor pressure" herein refers to the maximum pressure in the reactor, that is, the pressure immediately downstream of the secondary compressor, unless another meaning is obvious from the context).

In an aspect, chain transfer agents can be added in similar concentrations in each monomer feed. From an apparatus point of view, this can be achieved by mixing the transfer agent with the monomer fed before the monomer is compressed by the secondary compressor. In an aspect, chain transfer agent can be added equally along the length of the tube, although it may be consumed unequally and so concentration variations along the tube may result. Examples of chain transfer agents include butene-1, propane, hexane, isobutylene, isopropanol, propylene, propionaldehyde, and acetaldehyde.

In an aspect, a source of chain transfer agent 23 can be fluidically connected to the intake of the primary compressor 4 and hence distributed, after passing through the secondary compressor 5, to the different monomer feeds 3 spaced along the tube of tubular reactor 2. A recycle conduit 8 is fluidically connected to the low pressure separator 20 and the purge compressor 21. Recycle gas from the high pressure separator 18 can contain unconsumed transfer agent and can be passed to the intake of the secondary compressor. Thus, the transfer agent and monomer form a single, common gas stream with the desired concentration of transfer agent for compression in the secondary compressor 5 and for supply to the various feed positions 3 along the tube of tubular reactor 2.

Furthermore, by selecting the chain transfer agent which has a low chain transfer activity, higher concentrations of chain transfer agent have to be used in the non-polymer gaseous fraction of the tube contents to achieve a target MI. The low chain transfer activity contributes to the creation of small transfer agent concentrations along the length of the tube where the chain transfer agents also have a low reactivity ratio. By using unsaturated chain transfer agents with low chain transfer activity, branches are formed along the polymer backbone and the density of the resulting polymer is reduced. In such apparatus, mostly chain transfer agents have been used having a chain transfer constant of less than 0.03.

Monomers and comonomers that can be polymerized using the present methods include olefins including ethylene, propylene, butene-1, cis-butene-2, trans-butene-2, isobutylene, 3,3,-dimethylbutene-1, 4-methylpentene-1, octene-1, and styrene; vinyl type-esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene.

While the monomer and/or comonomer can be any molecule or molecules capable of addition polymerization by either a free-radical mechanism or coordination catalytic mechanism, the present methods are particularly useful for ethylene monomer. Other monomers/comonomers which may have transfer-activity and a molecular weight limiting effect (and indeed can, for some purposes, be regarded as incorporating transfer agents) include: vinyl acetate, ethyl acrylate, methyl acrylate, butyl acrylate, and the like. Most commonly ethylene monomer has a mole concentration of at least 90%, or 96%, or 98%, the percentages being based on the total weight of all monomer and chain transfer agent present.

The proportion of the total ethylene which enters the tubular reactor that is converted to polymer before exiting the reactor is referred to as a conversion. In the present processes, the conversion is at least 28%. Conversions of higher than 40% are feasible but are not preferred, partly because the viscosity of the reaction mixture increases with its polymer content, which leads in turn to an increase in the pressure drop required to maintain the necessary flow velocity.

Conversion achieved is in part related to the pressure at which the reactor operates, with a higher front end pressure both increasing the rate of polymerization and making possible a greater pressure drop over the length of the reactor. However, operating at higher pressures imposes more strain upon the secondary compressor and also increases the energy consumption with a consequent cost disadvantage. For such reasons, it may be desirable in some instances to operate at a pressure of from 2,300 to 2,800 bar at a relatively low conversion, which may be, for example, approximately in the region of from 28 to 32%. Alternatively, it may be desirable to operate at a pressure in the region of 2,800 to 3,100 bar at a high conversion, for example, in the range of from 32% to 37%. However, pressure is only one of the factors which influence conversion and overall the conversion rate is between about 30 to about 40% or between about 30 to about 37%.

Polyethylene compositions produced in the present processes and discharged from the final stage of the product separator can be fed to one or more hot melt extruders, for combination with additives, extruding and pelletizing, as required.

Polyethylene Compositions Produced by the Present Process Methods

The polyethylene compositions produced by the present processes are useful in making a wide variety of products and useful in many end-use applications. The polyethylene compositions can comprise low density polyethylenes, linear low density polyethylenes, medium density polyethylene, and high density polyethylenes.

In an aspect, the subject polyethylene compositions produced from the present processes comprise from about 50.0 mol. % to 100.0 mol. % of units derived from ethylene. The lower limit on the range of ethylene content can be from 50.0 mol. %, 75.0 mol. %, 80.0 mol. %, 85.0 mol. %, 90.0 mol. %, 92.0 mol. %, 94.0 mol. %, 95.0 mol. %, 96.0 mol. %, 97.0 mol. %, 98.0 mol. %, or 99.0 mol. % of units derived from ethylene, based on the mol. % of total polymer units. The polyethylene composition can have an upper limit on the range of ethylene content of 80.0 mol. %, 85.0 mol. %, 90.0 mol. %, 92.0 mol. %, 94.0 mol. %, 95.0 mol. %, 96.0 mol. %, 97.0 mol. %, 98.0 mol. %, 99.0 mol. %, 99.5 mol. %, or 100.0 mol. %, based on total polymer units.

In an aspect, the present polyethylene compositions provided herein have a density in accordance with ASTM D-4703 and ASTM D-1505/ISO 1183 between about 0.920 g/cm$^3$ and about 0.930 g/cm$^3$, and between about 0.923 and about 0.927 g/cm$^3$, particularly 0.923 g/cm$^3$.

The subject polyethylene compositions have an MI ($I_2$, 190° C., 2.16 kg) as measured by ASTM D-1238-E of about 0.1 g/10 min to about 5.0 g/10 min, about 0.5 to about 4 g/10 min, about 0.1 g/10 min to about 3.0 g/10 min, and about 2.0 g/10 min to about 4.0 g/10 min.

In an aspect, the polyethylene compositions produced by processes described herein have a molecular weight distribution, a weight average molecular weight to number average molecular weight (Mw/Mn) of about 2.0 to about 40. The ratio of Mw/Mn is measured by gel permeation chromatography techniques.

The polyethylene compositions have an MIR ($I_{21.6}/I_{2.16}$) (as defined below) between about 25.0 and about 80.0, between about 35.0 and about 75.0, between about 40.0 and about 70.0, between about 45.0 and about 65.0, between about 50 and about 80, between about 25 and about 40, between about 25 and about 45, and between about 25 and about 50.

Further provided herein are polyethylene compositions produced by polymerization of ethylene can optionally comprise any of the previously mentioned comonomers, such as propylene, butene-1, cis-butene-2, trans-butene-2, isobutylene, 3,3,-dimethylbutene-1, 4-methylpentene-1, octene-1, and styrene; vinyl type-esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene. Other suitable comonomers include vinyl acetate, ethyl acrylate, methyl acrylate, butyl acrylate, and the like.

In an aspect, during copolymerization, monomer feeds can be regulated to provide a ratio of ethylene to comonomer, e.g., alpha-olefin, so as to yield a polyethylene having a comonomer content, as a bulk measurement, of from about 0.1 mol. % to about 20 mol. % comonomer. In other embodiments the comonomer content is from about 0.1 mol. % to about 4.0 mol. %, or from about 0.1 mol. % to about 3.0 mol. %, or from about 0.1 mol. % to about 2.0 mol. %, or from about 0.5 mol. % to about 5.0 mol. %, or from about 1.0 mol. % to about 5.0 mol. %. The reaction temperature, monomer residence time, catalyst system component quantities, and molecular weight control agent (such as $H_2$) may be regulated so as to provide desired polyethylene compositions.

Comonomer content is generally based on the total content of all monomers in the polymer. The polyethylene copolymer has minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches can be present (i.e., less than 1.0 long-chain branch/1000 carbon atoms, preferably less than 0.5 long-chain branch/1000 carbon atoms, particularly 0.05 to 0.50 long-chain branch/1000 carbon atoms).

Further, in an aspect, polyethylene compositions can be blends of LDPE and other polymers, such as additional polymers prepared from ethylene monomers. Exemplary additional polymers are LLDPE (e.g., LLDPE homopolymers and/or copolymers of ethylene and alpha-olefin(s)), non-linear LDPE, very low density polyethylene ("VLDPE"), medium density polyethylene ("MDPE"), high density polyethylene ("HDPE"), differentiated polyethylene ("DPE"), and combinations thereof. DPE copolymers include EVA, EEA, EMA, EBA, and other specialty copolymers.

Polyethylene compositions comprising blended polymers include at least 0.1 wt. % and up to 99.9 wt. % of LDPE, and at least 0.1 wt. % and up to 99.9 wt. % of one or more additional polymers, with these wt. % based on the total weight of the polyethylene composition. Alternative lower limits of LDPE can be 5%, 10%, 20%, 30%, 40%, or 50% by weight. Alternative upper limits of LDPE can be 95%, 90%, 80%, 70%, 60%, and 50% by weight. Ranges from any lower limit to any upper limit are within the scope of the invention. In an aspect, the blends include from 5-85%, alternatively from 10-50% or from 10-30% by weight of the LDPE. The balance of the weight percentage is the weight of the additional and/or other type of polymers, e.g., different LLDPE, LDPE, VLDPE, MDPE, HDPE, DPE such as EVA, EEA, EMA, EBA, and combinations thereof.

The polyethylene compositions produced by the present processes are particularly suitable for electrical applications including, but not limited to, insulation, semiconducting or jacketing layers of power cables, telecommunications cables, and combined power/telecommunications cables.

For example, wire and cable applications for polyolefin compositions have been described in U.S. Pat. Nos. 5,795, 941; 5,430,091; 7,153,571; 8,183,328; 8,211,985; 9,284,415 and WO 2013/137953; See also, Kim, Y. et al. (1999) "Effect of Peroxide Modification on Melt Fracture of LLDPE During Extrusion," *Polymer Journal*, v. 31, pp. 579-584; Sentmanat, M. et al. (2004) "Mechanism of Gross Melt Fracture Elimination in the Extrusion of Polyethylenes in the Presence of Boron Nitride," *Rheol. Acta*, v. 43 pp. 624-633; Venet, C. et al. (1997) "Experimental Characterization of Sharkskin in Polyethylene," *J. Rheology*, v. 41 pp. 873-892; Vega, J. et al. (2011) "Eliminating Sharkskin Distortion in Polyethylene Extrusion by a Molecular Route", *J. Rheology*, v. 55, pp. 855-873; Sentmanat, M. et al. (2004) "Fingerprinting the Processing Behavior of Polyethylenes from Transient Extensional Flow and Peel Experiments in the Melt State," *Rheol Acta*, v. 44, pp. 1-15.

In various aspects, the polyethylene composition can be co-extruded with other polymers to form multilayered structures to further form various articles, such as wire and cable polymer cable-coatings or polymer wire-coating, tape and filaments. As used herein, "multi-layered" refers to structures including two or more polymers each forming a flat or round surface having an average thickness, the same or different, that have been combined together and caused to adhere to one another such as by application of radiation, heat, or use of adhesives to form a single multi-layer structure; preferably formed by a process of coextrusion utilizing two or more extruders to melt and deliver a steady volumetric throughput of different viscous polymers to a single extrusion head (referred to also as a "die") which will extrude the materials in the desired form. In an aspect, the polymer composition can be extruded using a single or twin screw extruder.

The features of the invention are described in the following non-limiting examples.

EXAMPLE 1

Low density polyethylene (LDPE) was generated in a tubular reactor according to processes (referred to sometime as methods) described herein. Polyethylene composition were made in a tubular reactor having five reaction zones. A comparative polyethylene composition "C$_1$" was made where each of the five reaction zones were maintained at a peak temperature of about 285° C. and a pressure of 2,700 bar. The production rate was about 31 to 32 T/h. Haze increased about 1% Dolci curve.

Low density polyethylene composition "S1" having a melt index of 2 was produced in a tubular reactor having a first reaction zone and a second reaction zone peak temperature at about 250 to 265° C. and a pressure of 2,600 bar, with production of about 31 to 32 T/h. Likewise, another polyethylene composition "S2" having a melt index of 2 was produced in a tubular reactor where the peak temperature of the first reaction zone and the second reaction zone was about 250° C. at a pressure of 3,000 bar, and resulting production rate of about 31 to 32 T/h.

Peak temperatures for each reaction zone in the tubular reaction for each sample are shown in Table 2.

TABLE 2

Peak Temperature (° C.) of Reaction Zones in Multi-feed Tubular Reactor

| ZONE | SAMPLE | | | |
|---|---|---|---|---|
| | LD101 | C1 | S1 | S2 |
| First reaction zone | 310 | 310 | 250 | 250 |
| Second reaction zone | 290 | 295 | 265 | 250 |
| Third reaction zone | 290 | 290 | 300 | 290 |
| Fourth Reaction Zone | 270 | 275 | 290 | 280 |
| Fifth Reaction Zone | 260 | 275 | 285 | 285 |
| Reactor Pressure, bar | 3000 | 2700 | 2600 | 3000 |

Relevant physical properties of polyethylene compositions are compared in Table 3.

TABLE 3

Polyethylene Composition Properties

| Polyethylene Composition Property | Film | Polyethylene Composition | | |
|---|---|---|---|---|
| | | C1 | S1 | S2 |
| Density* | 0.923 | 0.923 | 0.919 | 0.921 |
| MI (190° C./2.16 kg)* | 2.0 | 2 | 2 | 2 |
| MWD[2] | 7.0 | — | | 5.7 |
| MIR[1] | 47.6 | 49 | 53.7 | 53.1 |
| Haze[2] | 17.3 | | 5.2% | |

*Target values
[1]measured in test plant
[2]measured in products lab

In an effort to provide a low density polyethylene composition with broader melt index ratio, we discovered that polymerizing the ethylene monomer in a tubular reactor having slightly reduced peak temperatures in the first reaction zone and the second reaction zone would produce a polyethylene composition having a narrow molecular weight distribution. This is opposite of conventional thinking because typically, when the first and second reaction zones are operated at typical/standard peak temperatures, the molecular weight distribution is also broadened. Molecular weight distribution measurements from the ExxonMobil products lab, however, have shown that the polyethylene compositions produced from the processes described herein have a narrower molecular weight distribution when compared to polyethylene compositions made under typical reactor conditions. This was unexpected as our goal was to broaden the melt index ratio which normally implies broader molecular weight distribution. However, it appears a narrow molecular weight distribution is achieved in the early reaction zones (the first reaction zone and the second reaction zone) due the lower temperature and the subsequent distributions of the downstream zones (the third reaction zone, the fourth reaction zone and the fifth reaction zone). This result has been later verified by other reactor models. In addition, lower film haze was measured on the polyethylene compositions produced under the present/new processes.

We claim:

1. A polymerization process comprising the step of:
polymerizing ethylene and optionally one or more comonomers in a tubular reactor to produce a polyethylene composition having melt index ratio ($1_{21}/1_2$) within the range from 52 to 55 and molecular weight distribution ($M_w/M_n$) within the range from 5 to 6.5, wherein the tubular reactor is a multizone tubular reactor having at least three reaction zones, the at least three reaction zones comprising a first reaction zone, a second reaction zone, and a third reaction zone, each reaction zone spaced lengthwise along the tubular reactor, wherein at least the first reaction zone has a peak temperature between about 10° C. to 30° C. lower than a peak temperature in the second reaction zone.

2. The polymerization process of claim 1, wherein the peak temperature in the first reaction zone is between about 240° C. to about 260° C.

3. The polymerization process of claim 1, wherein the peak temperature in the second reaction zone and the third reaction zone is between about 270° C. to 295° C.

4. The polymerization process of claim 1, wherein the polyethylene composition further has one or both of the following properties:
density between 0.920 g/cm$^3$ and 0.927 g/cm$^3$; and
melt index ($I_2$) between 2.0 and 4.0 g/10 min.

5. A polymerization process comprising the step of:
polymerizing ethylene and optionally one or more comonomers in a tubular reactor to produce a polyethylene composition having melt index ratio ($I_{21}/I_2$, 190° C.) within the range from 52 to 55 and molecular weight distribution ($M_w/M_n$) within the range from 5 to 6.5,
wherein the tubular reactor is a multizone tubular reactor having at least five reaction zones, the at least five reaction zones comprising a first reaction zone, a second reaction zone, a third reaction zone, a fourth reaction zone and a fifth reaction zone, each reaction zone spaced lengthwise along the tubular reactor, wherein the first reaction zone and the second reaction zone each has a peak temperature between about 10° C. to 50° C. lower than a peak temperature in the third reaction zone.

6. The polymerization process of claim 5, wherein the peak temperature in the first reaction zone and the second reaction zone is between about 240° C. to about 260° C.

7. The polymerization process of claim 5, wherein the peak temperature in the third reaction zone, the fourth reaction zone and the fifth reaction zone are between about 270° C. to 295° C.

8. The polymerization process of claim 5, wherein the polyethylene composition further has one or both of the following properties:
density between 0.920 g/cm$^3$ and 0.927 g/cm$^3$; and
melt index ($I_2$, 190° C., 2.16 kg) between 2.0 and 4.0 g/10 min.

9. The polymerization process of claim 5, wherein the pressure of the tubular reactor is between about 2,700 bar to about 3,050 bar.

10. The polymerization process of claim 5, wherein initiator is discharged into the reactor at multiple free-radical initiator positions spaced lengthwise along the tubular reactor, and further wherein the peak temperature in each of the reaction zones is regulated by initiator flow rate.

11. The polymerization process of claim 10, wherein the number of free-radical initiator positions is equal to the number of reaction zones, and further wherein each reaction zone is downstream of each respective initiator injection position.

12. The polymerization process of claim 1, wherein initiator is discharged into the reactor at multiple free-radical initiator positions spaced lengthwise along the tubular reactor, and further wherein the peak temperature in each of the reaction zones is regulated by initiator flow rate.

13. The polymerization process of claim 12, wherein the number of free-radical initiator positions is equal to the number of reaction zones, and further wherein each reaction zone is downstream of each respective initiator injection position.

14. A polyethylene composition prepared by polymerizing a monomer mixture in a tubular reactor, wherein the tubular reactor is a multizone reactor having at least three reaction zones, comprising a first reaction zone, a second reaction zone, and a third reaction zone spaced lengthwise along the tubular reactor; wherein one or more of the first reaction zone and the second reaction zone has a peak temperature that is 10° C. to 30° C. lower than a peak temperature in the third reaction zone, wherein the polyethylene composition has a density between 0.920 g/cm$^3$ and 0.927 g/cm$^3$, an MI ($I_2$, 190° C., 2.16 kg) between 2.0 g/10 min and 4.0 g/10 min, an MIR ($I_{21}/I_2$) between 51 and 55, and a molecular weight distribution ($M_w/M_n$) that is either (i) less than or equal to 5.7 or (ii) between 5 and 6.5.

15. A wire coating comprising the polyethylene composition of claim 14.

* * * * *